United States Patent [19]

Kovach

[11] 4,292,059
[45] Sep. 29, 1981

[54] BY-PASS PROOF ADSORBER CELL

[76] Inventor: Julius L. Kovach, 2948 Brookdown Dr., Worthington, Ohio 43085

[21] Appl. No.: 157,481

[22] Filed: Jun. 9, 1980

Related U.S. Application Data

[63] Continuation-in-part of Ser. No. 834,313, Sep. 19, 1977, abandoned.

[51] Int. Cl.³ ............................................. B01D 53/04
[52] U.S. Cl. ...................................... 55/350; 55/387; 55/515; 55/518
[58] Field of Search ................. 55/387, 389, 491, 492, 55/515–519, 484, 350; 210/237, 238, 264, 282–286, 484, 485

[56] References Cited

U.S. PATENT DOCUMENTS

| | | | |
|---|---|---|---|
| 1,598,097 | 8/1926 | Mathis | 55/492 X |
| 1,941,450 | 1/1934 | Sylvan | 55/492 X |
| 3,166,382 | 1/1965 | Purse et al. | 55/517 X |
| 3,243,942 | 4/1966 | Burke | 55/387 |
| 3,411,273 | 11/1968 | Duncan et al. | 55/387 |
| 3,581,476 | 6/1971 | Rivers | 55/387 |
| 3,630,007 | 12/1971 | Neumann | 55/387 |
| 3,815,335 | 6/1974 | Barnebey | 55/516 X |
| 3,912,472 | 10/1975 | Marble | 55/515 X |
| 3,926,599 | 12/1975 | Rudin et al. | 55/517 X |
| 3,961,920 | 6/1976 | Gilbert | 55/387 |
| 3,964,890 | 6/1976 | Bonn | 55/518 X |
| 3,969,095 | 7/1976 | Kurahashi | 55/387 X |
| 4,005,017 | 1/1977 | Kusano et al. | 55/387 X |
| 4,048,073 | 9/1977 | Rose | 210/484 X |
| 4,049,406 | 9/1977 | Rivers | 55/484 |

FOREIGN PATENT DOCUMENTS

| | | | |
|---|---|---|---|
| 1067415 | 10/1959 | Fed. Rep. of Germany | 55/515 |
| 202861 | 8/1923 | United Kingdom | 55/519 |

Primary Examiner—Robert H. Spitzer
Attorney, Agent, or Firm—Mueller and Smith

[57] ABSTRACT

Disclosed is an adsorber module, preferably of rectangular shape, for housing particulate adsorbent material. The module basically comprises an outer shell surrounding an inner shell, each made of a rigid, rectangular frame which retains foraminous sheets therebetween. Opposing walls of the outside and inside shells are spaced apart sufficiently for housing the particulant adsorbent material. One end of each shell is attached to a common end plate having an opening therein for effluent gas or vapor. The other end of the outer shell and the corresponding end of the inner shell are spaced-apart an appreciable distance to also accommodate particulate adsorbent material. The adsorber module can be adapted to form a sampler module containing independent sub-compartments which are not in mutual communication. The adsorbent in the independent sub-compartments can be removed separately to assay the extent of sorbable component adsorbed thereby to adjudge the useful life of the adsorbent material housed in said module and in an array of adsorber modules containing the sampler module.

10 Claims, 6 Drawing Figures

BY-PASS PROOF ADSORBER CELL

CROSS REFERENCE TO RELATED APPLICATIONS

This application is a continuation-in-part of application Ser. No. 834,313, filed on Sept. 19, 1977, now abandoned.

BACKGROUND OF THE INVENTION

The present invention relates to adsorption apparati and more specifically to a modular adsorber cell for housing particulate adsorbent material therein which prevents by-pass of gas or vapor flowing therethrough.

The removal of a sorbable component from a gas or vapor stream by flowing such stream through a body of adsorbent material is a fundamental engineering practice. In the removal of a gaseous radioactive material from the atmosphere of nuclear reactor installations or other facilities which handle gaseous streams containing radioactive materials, conventional commercial adsorber cells typically are of two distinct forms. The first form is known as a dual-pleated form which utilizes continuous perforated plates for containing the particulate adsorbent material. The second form consists of individual slab-shaped units which typically are constructed from two solid sidewalls attached to a top and a bottom perforated metal plate. Within this structure a pair of parallel, spaced-apart inner perforated plates are disposed by attachment to the two solid sidewalls which also support such inner perforated plates. Adsorbent material is packed in the two outer-defined compartments and is retained therein by suitably designed end plates. The gas or vapor stream containing the sorbable radioactive component to be removed is flowed from the exterior of the cell through the beds of particulate material and thence into the empty chamber formed by the two inner perforated plates which empty chamber is connected to an outlet header for removal of the cleaned stream.

The slab-shaped units suffer many disadvantages. Because the two inner plates extend completely to, and are joined to, the supportive solid sidewalls, there is by-passing or short circuiting of the contaminated gas stream along the surface of such sidewalls directly to the interior outlet chamber of the unit. Thus, some of the incoming stream is not sufficiently contacted by the adsorbent medium for removal of the sorbable component therefrom. Such by-passing or channeling of the gas stream results because the packing density of the particulate adsorbent material is much less against the smooth flat metal surface of the supportive sidewalls than the packing density of the particulate medium against itself. Accordingly, the gas flow path along the solid supportive sidewalls provides less resistance to the stream to be cleaned (a lower pressure drop) resulting in a significant portion of the gas stream following such path and by-passing the adsorbent material. A disadvantage from which both the slab-like and the dual-pleated units suffer is the necessity for all structural members of these units to be joined by seam welds to further reduce by-passing of the gas stream through the units. The use of seam welds to construct these units is an expensive manufacturing technique, especially when compared to use of other joining techniques such as, for example, spot welding, pop-riveting, and the like.

These and many other disadvantages inherent in prior adsorber units or cells are overcome by the specific design of the modular adsorber cell of the present invention.

BROAD STATEMENT OF THE INVENTION

The present invention is directed to an adsorber module for housing particulate adsorbent material therein for adsorbing a sorable component of a gas or vapor stream passed therethrough. The adsorber module comprises:

a. rigid, rectangular, exterior frame with an upper, a lower, and two side foraminous sheets retained thereby; an exterior solid rear end plate removably attached to the rear end of said exterior frame; and an exterior solid front plate with a rectangular opening penetrating therethrough attached to the front end of said frame;

b. a rigid, rectangular, interior frame with an upper, a lower, and two side interior foraminous sheets retained thereby disposed within said exterior frame; an interior solid rear end plate attached to the rear end of said interior frame; the front end of said interior frame attached to said exterior solid front plate, the outlet chamber formed by said interior frame being co-extensive in cross-sectional area with said rectangular opening therein; said interior and exterior frames, said interior and exterior rear end plates, and said interior and exterior foraminous sheets being in parallel but spaced-apart relationships to define a plenum chamber therebetween; and c. a plurality of rigid rib-like members disposed within said plenum chamber running from said interior rear plate to said exterior front plate to maintain and define said spaced-apart relationships and to further define subcompartments of said plenum chamber the entire length of said interior shell, at least one of said members being disposed between said exterior and said interior upper sheets and between said exterior and interior lower sheets.

Another aspect of the present invention is a sampler module which can be made by adaptation of said adsorber module. The sampler module is of substantially the same construction as said adsorber module, except that the exterior solid rear end plate there of is replaced by a transverse adapter having orthogonally disposed compartmentalizing members which are arranged to coincidentally engage with said plurality of rib-like members to form a plurality of independent sub-compartments within said plenum chamber which are not in mutual communication therein. A retainer whose shape follows the edgewise profile of said adapter and compartmentalizing members is secured to the exterior frame at its rear end. A plurality of sub-compartment solid rear end plates are removably attached to the adapter and cover the opening of each of said independent sub-compartments for retaining particulate adsorbent material housed therein. The adsorbent material disposed within each of the independent sub-compartments of the sampler module can be removed separately to assay the extent of the sorbable component adsorbed by said adsorbent material for adjudging the useful life of said adsorbent material. The removal of adsorbent material from any independent sub-compartment does not disrupt the adsorbent material within the other independent sub-compartments.

Advantages of the present invention include the by-pass proof feature of the adsorber module wherein substantially all gas or vapor passed therethrough will effectively contact the adsorbent material housed therein. The construction features of the adsorber module which give rise to this by-pass proof feature will be described in detail below. Additional advantages of the present invention include that no seam welds are required for constructing the adsorber module which makes such module relatively inexpensive to construct and maintain. A further advantage of the present invention is that the adsorber module is substantially non-deformable under packing of adsorbent material and under heating, as well as when such modules are stacked for forming an array of modules. Another advantage of the present invention is that the adsorber module can be relatively easily adapted to form a sampler module. These and other advantages will become readily apparent to those skilled in the art based upon the disclosure contained herein.

The drawings will be described in detail in connection with the Description of the Invention which follows.

DETAILED DESCRIPTION OF THE INVENTION

Figure 1:
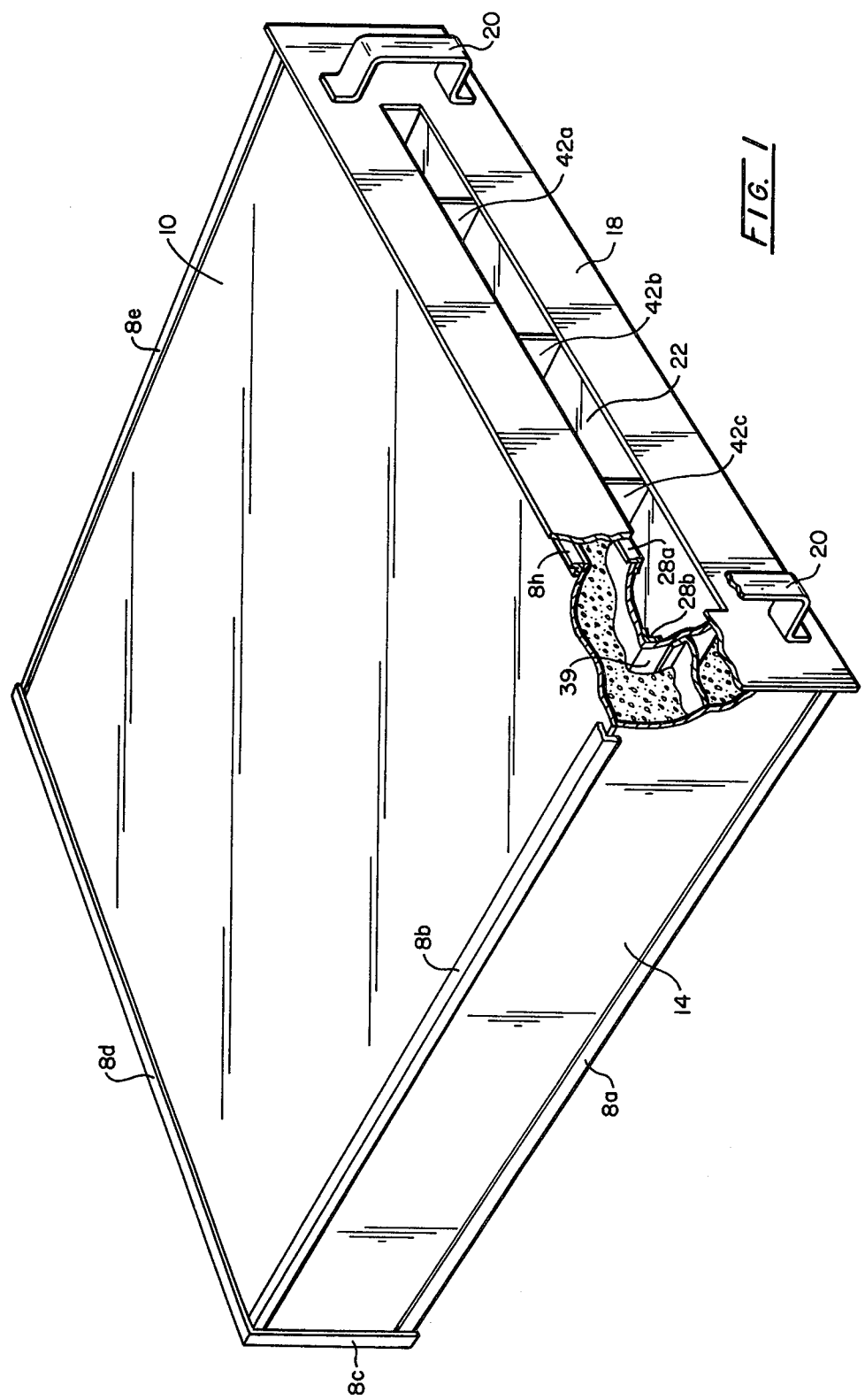
FIG. 1 is a perspective view of the front of the preferred adsorber module of the present invention with a portion thereof broken away to show its interior construction.
Figure 2:
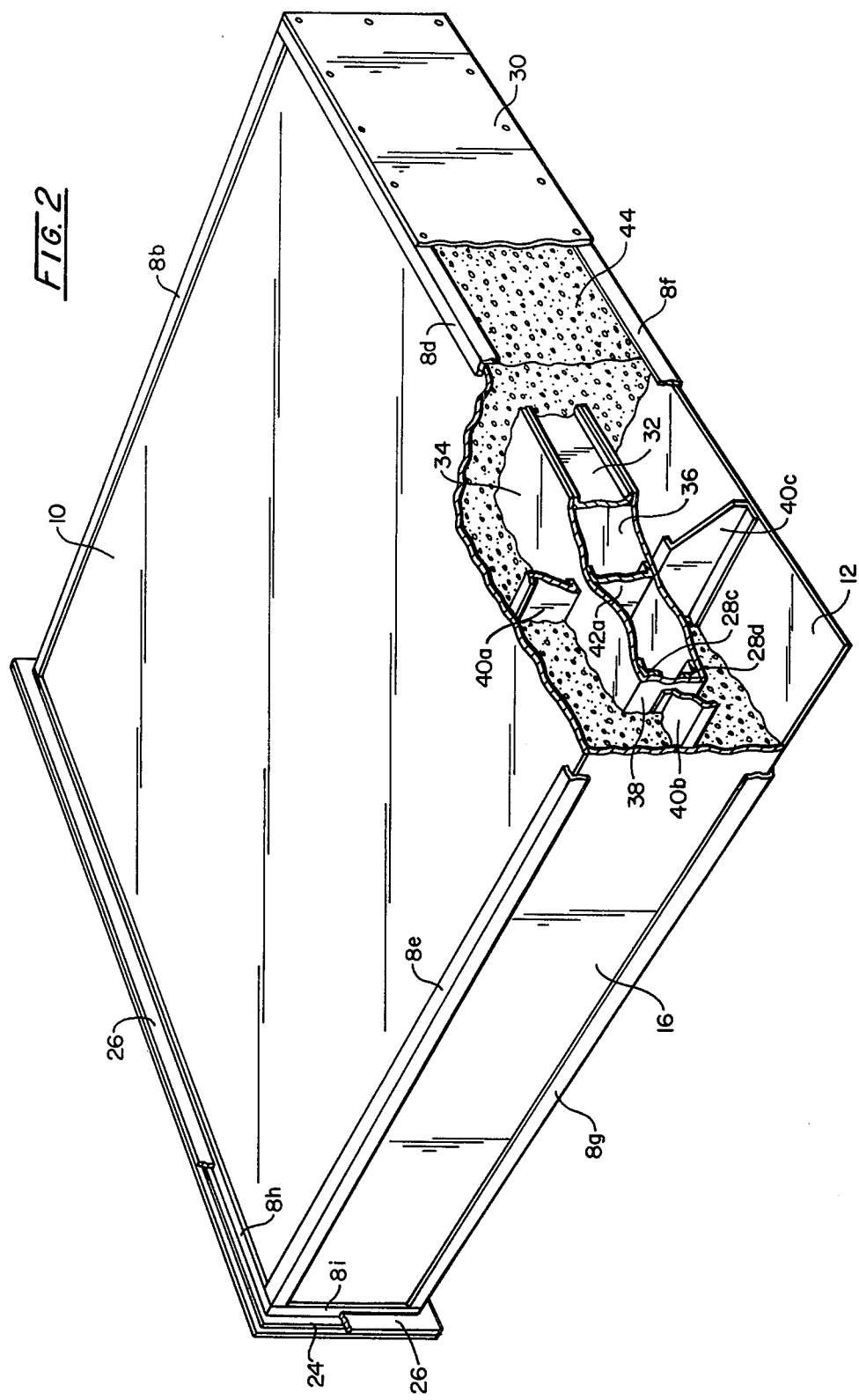
FIG. 2 is a perspective view of the reverse or rear end of the module shown in FIG. 1, with a portion of the rear end being broken away to show its interior construction.

Referring to FIG. 1, the exterior structure of the adsorber module is defined by a rigid, rectangular, exterior frame composed of exterior frame members 8 (composed of members 8a, 8b, 8c, 8d, 8e, 8f, 8g, 8h, and 8i). Exterior frame members 8 retain upper exterior forminous sheet 10, lower exterior foraminous sheet 12 (FIG. 2), exterior side foraminous sheet 14, and exterior side foraminous sheet 16 (FIG. 2). The exterior frame composed of exterior frame members 8 is attached to exterior solid front plate 18 which has a pair of handles 20 for easy lifting and carrying of the module by workers. Exterior front plate 18 also has rectangular opening 22 penetrating therethrough which provides communication from the outside to the interior outlet chamber (which will be described below). As can be seen in FIGS. 1 and 2, exterior front plate 18 extends outside of the cross-sectional plane of the exterior frame. Framing member 24 (FIG. 2) connects the exterior frame composed of exterior frame members 8 to exterior front plate 18 at this extension or lip of front plate 18. In use, the adsorber module, typically formed into a large bank or array of adsorber modules, is inserted into an opening of suitable size so that the extension or lip of exterior front plate 18 engages the outer surface around such opening. The gas or vapor to be cleaned flows into the module through exterior foraminous sheets 10, 12, 14, and 16, through the particulate adsorbent housed in the module, and out rectangular opening 22 in exterior front plate 18 in clean condition. Thus, the extension or lip of exterior front plate 18 is required to sealingly engage the area about the opening through which the module is placed. Accordingly, it is desirable to use continuous seam welds for joining the exterior frame to exterior front plate 18 by framing member 24. It is to be noted that this is the only location in the module whereat seam welds are required. It is to be noted also that should seam welds not be used for this connection or in order to account for possible leaks from seam welds, double-sided gasket 26 (FIG. 2) is placed on top of framing member 24 and the lip or extension of exterior front plate 18 for sealingly engaging such extension and the area around the opening in which the module is placed in use. The module is closed at its rear end by solid exterior rear end plate 30 (FIG. 2), though no seam welds or other gas barrier seal is required for attaching plate 30 to the exterior frame.

The outlet chamber disposed in the adsorber module is formed by a rigid, rectangular, interior frame composed of interior frame members 28 members 28a, 28b, 28c, and 28d shown in (FIGS. 1 and 2). Such interior frame is attached to exterior front plate 18 such that the outlet chamber within the interior frame is coextensive in cross-sectional area with rectangular opening 22 penetrating through exterior front plate 18. Referring to FIG. 2, the interior frame retains upper interior foraminous sheet 34, lower interior foraminous sheet 36, side interior foraminous sheet 38, and side interior foraminous sheet 39 (FIG. 1). Except where the interior frame is connected to exterior front plate 18, all of the respective interior and exterior frame members, and the respective interior and exterior foraminous sheets are in parallel but spaced-apart relationship to define a plenum chamber therebetween for housing particulate adsorbent material 44. As can be seen in FIG. 2, the outlet chamber formed by the interior frame composed of interior frame members 28 is not connected to any sidewall or to the rearwall of the module. Such construction substantially eliminates any chance that the vapor or gas to be cleaned would be able to by-pass effective contact with the particulate adsorbent material. The spacing between the exterior and interior foraminous sheets should be about 2 inches or more for providing sufficient adsorbent material and consequent contact time with the vapor or gas flowed through the module for adsorbing a sorbable component in such stream for its removal therefrom.

Referring to FIG. 2, the spaced-apart relationship between the interior and exterior frames and foraminous sheets retained thereby for forming the plenum chamber is ensured by rib-like members 40 members 40a, 40b, and 40c shown, and (which can be of a Z- or U-shape in cross-section, for example) which run from exterior front plate 18 to interior solid rear end plate 32. These rib-like members are tapered adjacent foraminous sheets 10 and 12 to the exterior frame at frame members 8d and 8f. For further structural integrity of the adsorber module, especially under loading and heating conditions, rigid rib-like members 42 (members 42a, 42b, and 42c shown in FIG. 2) are disposed within the outlet chamber of the interior frame. Thus, it can be seen that the strength and structural integrity of the adsorber module is accomplished by the exterior frame composed of exterior frame members 8, the interior frame composed of interior frame members 28, and rigid rib-like members 40 and 42. Accordingly, no structural integrity is required of the foraminous sheets of the module. Thus, while the foraminous sheets can be made from high-strength perforated metal, the use of such rigid material for forming such foraminous sheets is not required by the unique construction of the adsorber module of the present invention.

Figure 4:
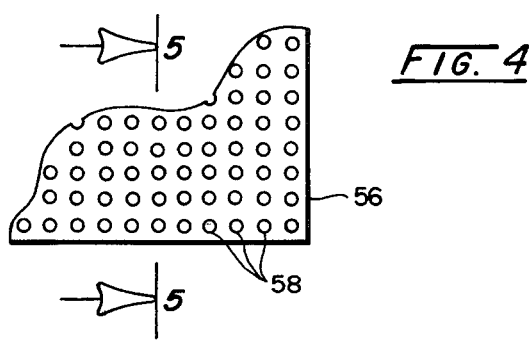
FIG. 4 is a partial section of any of the foraminous plates of the adsorber module or sampler module shown in FIGS. 1-3.
Figure 5:
FIG. 5 is a section taken along line 5—5 of FIG. 4.
Figure 6:
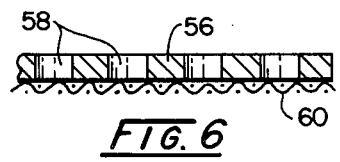
FIG. 6 is a cross-sectional view of an alternative foraminous sheet arrangement for use with the adsorber module of the present invention.

In this connection, reference is made to FIG. 4 which shows the presently preferred details of all foraminous sheets used for constructing the adsorber module. Plate 56 preferably is of metal and has holes 58 which penetrate therethrough for providing communication between the outside and inside of the adsorber module. FIG. 5 shows the perforated plate of FIG. 4 in cross-sectional elevation taken along line 5—5. The size of the holes 58 are such that the particulate material housed in the plenum chamber is effectively retained in the module. Additional foraminous material for use in the present invention can take the form of perforated plastic sheets, expanded metal or plastic, woven wire or plastic screening, or other material having the desired properties for retaining the particulate adsorbent in the module but permitting the flow of gas or vapor therethrough. When extremely fine particulate material is intended for use in the module, the size of the holes in the exterior foraminous sheets must be of smaller size so that the particulate adsorbent material can be retained therein. Often, a perforated plate cannot be used for such fine particulate adsorbent material because sufficient gas could not flow through such fine openings. As shown in FIG. 6, this problem is solved by placing screening material 60 on the inside of the perforated plate. This arrangement with fine mesh screening provides retention of the fine particulate adsorbent material in the module, but retains the advantage of extra durability and strength of the module by use of perforated plating for the outer layer of the foraminous sheets. Note that for use of the adsorber module in a nuclear installation, the size of the perforations in the plate forming the foraminous sheets is governed by ANSI N509 standard.

In constructing the adsorber module of the present invention, it should be noted that the foraminous sheets can be attached to their respective frame members by pop-rivets, spot-welds, or the like. No continuous seam welding is required for attachment of the foraminous sheets nor for attachment of end plates 30 and 32 to their respective frame members. Attachment of rib-like members 40 and 42 to the foraminous sheets can be accomplished by spot-welding or pop-riveting additionally. Clearly, this method of construction substantially reduces the construction costs of the module as well as simplifying maintenance costs of the module.

Figure 3:
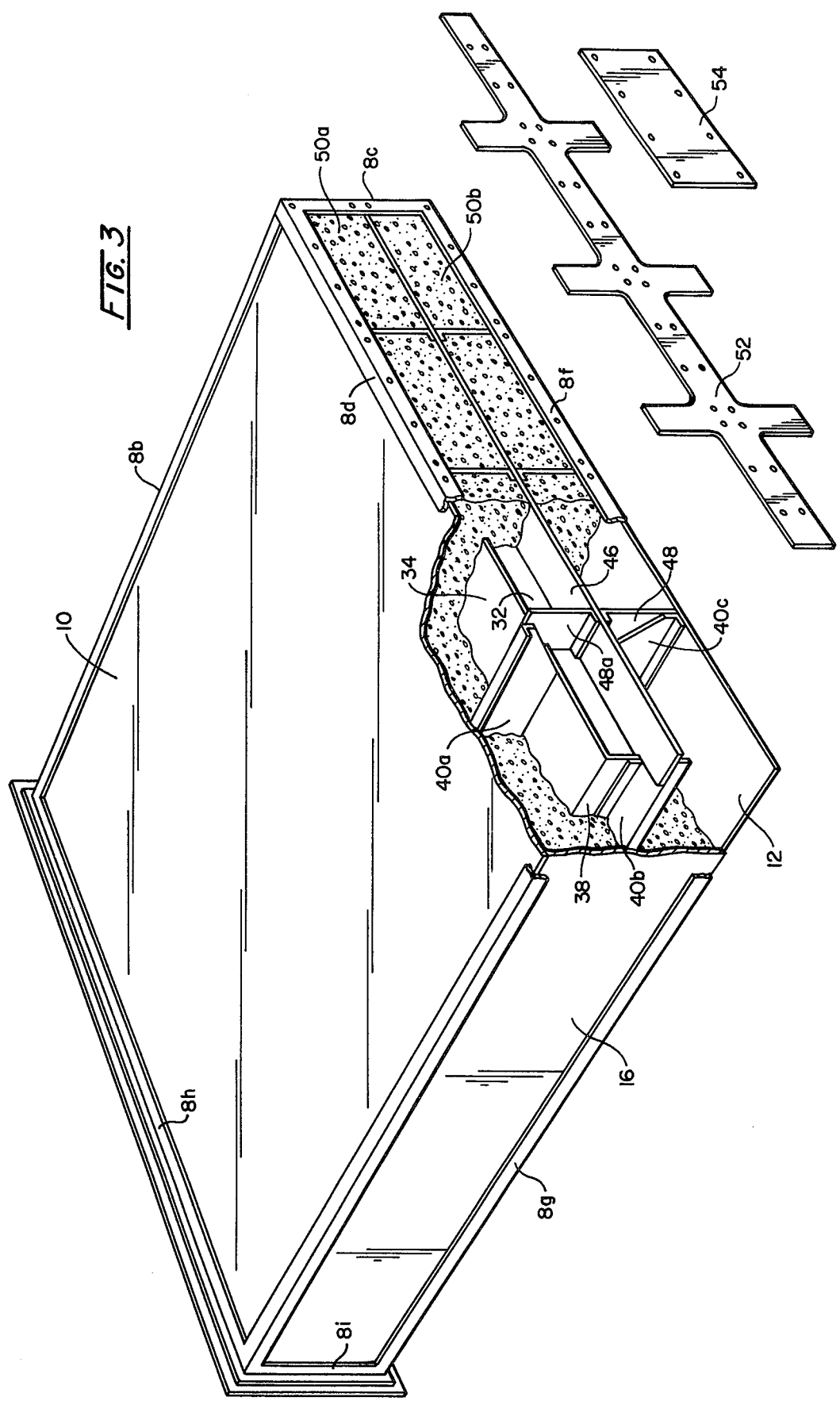
FIG. 3 is a perspective view like that shown in FIG. 2 of a sampler module which has been adapted from the adsorber module shown in FIGS. 1 and 2, with a portion of the sampler module being broken away at its rear end to show its interior construction.

In use of the adsorber module, such modules typically are used in large arrays or banks thereof. The useful life of the particulate adsorbent material (preferably activated carbon) necessarily depends upon the quantity of contaminant sorbable component in the gas or vapor stream passed therethrough. Since the quantity of such sorbable component can vary as a function of time, a method for easily assaying the extent of sorbable component adsorbed onto the particulate adsorbent material is desirable. According to the precepts of the present invention, this can be accomplished readily and easily by converting the adsorber module into a sampler module. Such sampler module can be placed in the array of adsorber modules and the contents of the adsorbent material therein analyzed periodically in order to assay the extent of sorbable component adsorbed onto the particulate adsorbent in order to adjudge the useful life of the adsorbent material housed in all of the other modules forming the array. FIG. 3 shows the construction details of such a sampler module and the method for adapting the adsorber module to become a sampler module. Referring to FIG. 3, transverse adapter 46 bears orthogonally disposed compartmentalizing members 48 and 48a. Compartmentalizing members 48 are arranged to coincidentally engage with rib-like members 40 to form a plurality of independent sub-compartments 50 within the plenum chamber. Such independent sub-compartments 50 are not in mutual combination within the module. Retainer 52 has a shape which follows the edgewise profile of adapter 46 and compartmentalizing members 48. Retainer 52 is secured to exterior frame members 8d and 8f and may additionally be secured to adapter 46 and compartmentalizing members 48 if desired. Solid sub-compartment rear end plates 54 (only one thereof being shown in FIG. 3) are removably attached to adapter 52, such as by pop-rivets or the like, and cover the opening of each independent sub-compartment 50 for retaining particulate adsorbent material 44 therein. In use, each of the individual independent sub-compartments (eg. sub-compartment 50a, sub-compartment 50b, etc.) can be opened by removal of the appropriate sub-compartment rear end plate (eg. plate 54) and the particulate adsorbent in the sub-compartment removed. Such removed-adsorbent then can be assayed to determine the extent of sorbable component adsorbed thereon and to adjudge the useful life of all modules in the array which were placed in the array at the same time as was the sampler module. Note that the removal of the adsorbent material from any one sub-compartment does not disrupt the adsorbent material contained in any other sub-compartment. In the specific sampler module shown in FIG. 3, there are eight sub-compartments. This means that this one sampler module can be used a total of eight times for checking the useful life of the adsorbent. For example, should this check be required once a month, the sampler module shown in FIG. 3 can be used up to eight months in determining the useful life of the particulate adsorbent in the array. Also, such sampler module is an effective adsorber module for adsorbing the sorbable component of a gas or vapor stream passed therethrough. Of course, new adsorbent replaces the removed adsorbent from the independent sub-compartment so that the sampler module retains its adsorbing capacity.

I claim:

1. An adsorber module for housing particulate adsorbent material therein for adsorbing a sorbable component of a gas or vapor stream passed therethrough, comprising:

a. a rigid, rectangular, exterior frame with an upper, a lower, and two side foraminous sheets retained thereby; an exterior solid rear end plate removably attached to the rear end of said exterior frame; and an exterior solid front plate with a rectangular opening penetrating therethrough attached to the front end of said frame;

b. a rigid, rectangular, interior frame with an upper, a lower, and two side interior foraminous sheets retained thereby disposed within said exterior frame; an interior solid rear end plate attached to the rear end of said interior frame; the front end of said interior frame attached to said exterior solid front plate, the outlet chamber formed by said interior frame being coextensive in cross-sectional area with said rectangular opening in said exterior solid front plate; said interior and exterior frames, said interior and exterior rear end plates, and said interior and exterior foraminous sheets being in parallel but spaced-apart relationships to define a plenum chamber therebetween for housing said particulate adsorbent material; and c. a plurality of rigid rib-like members disposed within said plenum chamber running from said interior rear plate to said exterior front plate to maintain and define said spaced-apart relationships and to further define sub-compartments of said plenum chamber which are in communication within said plenum chamber, at least one of said members being disposed between said exterior and said interior upper sheets and between said exterior and the interior lower sheets.

2. The adsorber module of claim 1 wherein a plurality of said rigid rib-like members are disposed between said exterior and interior upper sheets and between said exterior and interior lower sheets.

3. The adsorber module of claim 2 wherein a plurality of rigid rib-like members are disposed within said interior frame running from said interior solid rear end plate to the front end of said interior frame.

4. The adsorber module of claim 3 wherein said exterior front plate extends beyond said exterior frame and sheets, and said extension bears a gasket sealingly attached thereto which contains a sealingly adapted surface on the other side thereof.

5. The method of claim 4 wherein no continuous seam welds are used to attach any of said foraminous plates to their respective frames.

6. The adsorber module of claim 4 wherein a particulate adsorbent material is housed within said plenum chamber and said sub-compartments thereof.

7. An array of the adsorber module of claim 6 having said modules arranged to mutually contact said gas or vapor stream for passing through said modules.

8. The adsorber module of claim 4 wherein said foraminous plates are constructed from one of the group of or combinations thereof: perforated metal or plastic, expanded metal or plastic, and woven metal or plastic wire.

9. The adsorber module of claims 1 or 4 wherein said exterior solid rear end plate is replaced by a transverse adapter having orthogonally disposed compartmentalizing members which are arranged to coincidentally engage with said plurality of rib-like members in said plenum chamber to form a plurality of independent sub-compartments within said plenum chamber which are not in mutual communication therein, a retainer whose shape follows the edgewise profile of said adapter and compartmentalizing members which retainer is secured to said exterior frame, and a plurality of sub-compartment solid rear end plates removably attached to said adapter and covering the opening of each of said independent sub-compartments for retaining particular adsorbent material housed therein, thereby converting said module into a sampler module wherein adsorbent material disposed within each of said independent sub-compartments can be removed separately to assay the extent of said sorbable component adsorbed by said adsorbent material to adjudge the useful life of said adsorbent material, the removal of adsorbent material from any independent sub-compartment not disrupting the adsorbent material within the other independent sub-compartments.

10. The adsorber module of claim 1 wherein one rib is disposed between said interior and exterior side sheets on both sides thereof.

* * * * *